United States Patent
Jung et al.

(10) Patent No.: US 11,048,692 B2
(45) Date of Patent: Jun. 29, 2021

(54) PARTITION MOVE IN CASE OF TABLE UPDATE

(71) Applicant: SAP SE, Walldorf (DE)

(72) Inventors: SungGun Jung, Anyang (KR); Sukhyeun Cho, Kimpo (KR); Taesik Yoon, Seoul (KR); Joern Schmidt, Walldorf (DE)

(73) Assignee: SAP SE, Walldorf (DE)

( * ) Notice: Subject to any disclaimer, the term of this patent is extended or adjusted under 35 U.S.C. 154(b) by 197 days.

(21) Appl. No.: 16/373,052

(22) Filed: Apr. 2, 2019

(65) Prior Publication Data

US 2020/0320060 A1    Oct. 8, 2020

(51) Int. Cl.
*G06F 16/23* (2019.01)
*G06F 16/2455* (2019.01)
*G06F 16/22* (2019.01)
*G06F 16/27* (2019.01)

(52) U.S. Cl.
CPC ...... *G06F 16/2379* (2019.01); *G06F 16/2282* (2019.01); *G06F 16/24553* (2019.01); *G06F 16/278* (2019.01)

(58) Field of Classification Search
CPC ............. G06F 16/2282; G06F 16/2379; G06F 16/24553; G06F 16/24554; G06F 16/278
See application file for complete search history.

(56) References Cited

U.S. PATENT DOCUMENTS

| | | | |
|---|---|---|---|
| 5,625,815 A * | 4/1997 | Maier | G06F 16/284 |
| 9,922,086 B1 * | 3/2018 | Huang | G06F 16/2379 |
| 2002/0194149 A1 * | 12/2002 | Gerber | G06F 16/284 |
| 2007/0043749 A1 * | 2/2007 | Gerber | G06F 16/2343 |
| 2007/0271211 A1 * | 11/2007 | Butcher | G06F 16/2282 |
| 2015/0370825 A1 * | 12/2015 | Outcalt | G06F 16/27 |
| | | | 707/608 |
| 2017/0177700 A1 * | 6/2017 | Bensberg | G06F 16/278 |
| 2018/0203913 A1 * | 7/2018 | Bourbonnais | G06F 16/27 |
| 2020/0089792 A1 * | 3/2020 | Packirisamy | G06F 16/2365 |

* cited by examiner

*Primary Examiner* — James E Richardson
(74) *Attorney, Agent, or Firm* — Buckley, Maschoff & Talwalkar LLC

(57) ABSTRACT

A system includes reception of a query to update a partition key value of a first set of rows of a database table, determination, based on fetched row identifiers, of a first subset of the first rows which are not stored on the first database server node and a second subset of the first rows which are stored on the first database server node, fetching of the first subset of rows from the database server nodes, update of the partition key value of each row of the fetched first subset of rows, instructing of the first database server node to: store the updated rows of the fetched first subset in the first partition stored on the first database server node, and update the partition key value of each of the second subset of rows of the partition stored on the first database server node.

18 Claims, 11 Drawing Sheets

PARTITION MOVE IN CASE OF TABLE UPDATE

BACKGROUND

Database systems may provide distributed data storage and distributed query execution. For example, a database system may include one or more database nodes, each of which stores unique data and is capable of executing query operators. A distributed architecture may therefore require the execution of queries on data which spans multiple database nodes.

In a distributed database, the rows of a table may be assigned to different table partitions. The partition to which a row is assigned may be determined based on a value of a partitioning key field of the row. If the value of the partitioning key field is updated, the row may be assigned to a new partition. Since different partitions of a table may be stored at different nodes, assignment of a row to a new partition may require movement of the row from one database node (i.e., where the original partition of the row is stored) to another database node (i.e., where the new partition is stored).

An update query statement may update the partitioning key field of many rows of a database table. Conventionally, these rows are fetched and analyzed to determine whether to move the rows to new partitions based on the updated partitioning key fields. The rows are then moved to appropriate partitions (i.e., to the database nodes storing the appropriate partitions). The fetching and storage of the rows, which may consist of dozens of columns, may result in unsuitable transaction latency and resource consumption.

DETAILED DESCRIPTION

The following description is provided to enable any person in the art to make and use the described embodiments and sets forth the best mode contemplated for carrying out some embodiments. Various modifications, however, will be readily-apparent to those in the art.

Some embodiments relate to the movement of table rows to a new partition based on an instruction to update to their partitioning key fields. For example, the row identifiers of the rows to be updated are fetched and, based on the row identifiers, the rows which are to be moved to a new partition as a result of the update are identified. The rows to be moved are then fetched from their respective nodes and the partition key values of the fetched rows are updated. The updated rows are stored in the new partition and deleted from their original nodes. Finally, any rows to be updated which are already on the new partition are updated on-node. Such features may improve transaction latency and reduce resource consumption.

Figure 1:
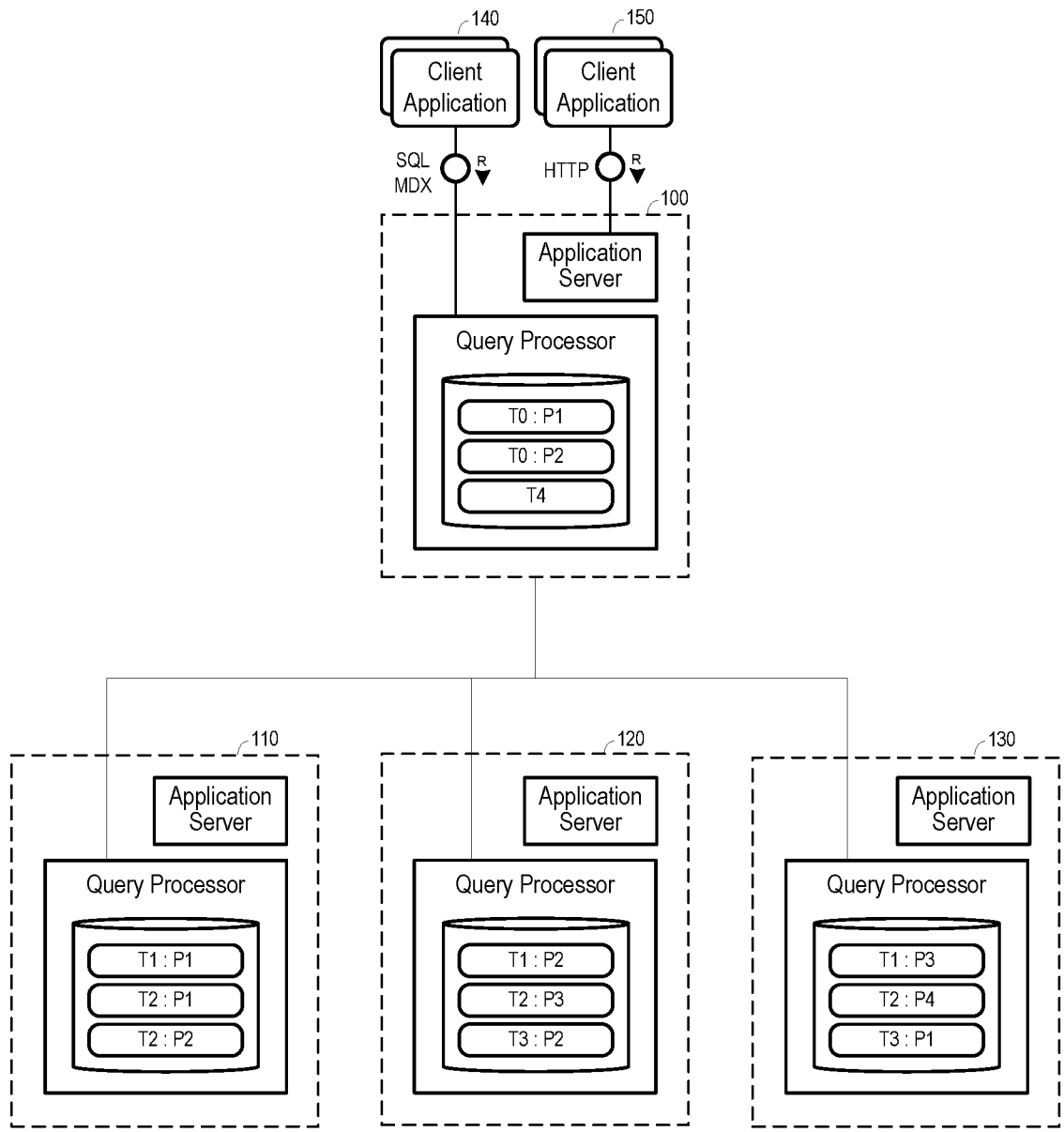
FIG. 1 is a block diagram of a distributed database system including partitioned tables according to some embodiments.

FIG. 1 is a block diagram of a distributed database architecture according to some embodiments. Embodiments are not limited to the FIG. 1 architecture.

FIG. 1 illustrates server nodes 100, 110, 120 and 130. Although FIG. 1 illustrates node 100 receiving requests from client applications 140 and 150, generally, any one of nodes 100, 110, 120 and 130 may receive a query from client applications 140 and 150 and returns results thereto based on data stored within nodes 100, 110, 120 and 130. A received query may include instructions to create, read, update or delete one or more records stored in any one or more of nodes 100, 110, 120 and 130.

Each of nodes 100, 110, 120 and 130 executes program code to provide an application server and a query processor. The application server provides services for executing server applications. For example, Web applications executing on an application server may receive HyperText Transfer Protocol (HTTP) requests from client applications 150 as shown in FIG. 1.

A query processor contains the actual stored data and engines for processing the data. An execution engine of a query processor may provide one or more physical operators corresponding to one or more logical operators. The physical operators may comprise processor-executable program code which is executable to perform corresponding logical operations (e.g., INSERT, JOIN, SELECT, etc.) on stored data. The set of logical operators for which an execution engine includes one or more physical operators might not be identical across execution engines. Moreover, a physical operator provided by one execution engine and corresponding to a logical operator may differ from a physical operator provided by another execution engine and corresponding to the same logical operator. The data format output by various physical operators of various execution engines (even those corresponding to a same logical operator) may differ as well.

The query processor is responsible for processing Structured Query Language (SQL) and Multi-Dimensional eXpression (MDX) statements and may receive such statements directly from client applications 140. The query processor may also include a statistics server for use in determining query execution plans. A compilation server may also be provided to compile stored procedures and programs.

Each of server nodes 100, 110, 120 and 130 may include many additional software components providing functionality that is or becomes known. For example, server nodes 100, 110, 120 and 130 may include components to perform administrative and management functions. Such functions may include snapshot and backup management, indexing, optimization, garbage collection, and/or any other database functions that are or become known.

In some embodiments, the data of server nodes 100, 110, 120 and 130 may comprise one or more of conventional tabular data, row-based data, column-based data, and object-based data. Moreover, the data may be indexed and/or selectively replicated in an index to allow fast searching and retrieval thereof. Server nodes 100, 110, 120 and 130 may support multi-tenancy to separately support multiple unrelated clients by providing multiple logical database systems which are programmatically isolated from one another.

One or more of server nodes 100, 110, 120 and 130 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Each of server nodes 100, 110, 120 and 130 includes table partitions. The notation Tt: Pp represents partition p of table Tt. As shown, some tables (e.g., T1, T2, T3) consist of partitions stored on more than one server node. The partitions of table T0 are stored entirely on server node 100, and Table T4 of server node 100 is not partitioned.

As described above, the rows of a given table may be assigned to different table partitions based on the values of a partitioning key field of each row. The partitioning key column of the table is defined by an administrator during creation of the table. Updating the value of the partitioning key field of a row may change the partition to which the row belongs and therefore require the row to be moved from one database node (i.e., where the original partition of the row is stored) to another database node (i.e., where the new partition is stored).

Figure 2:
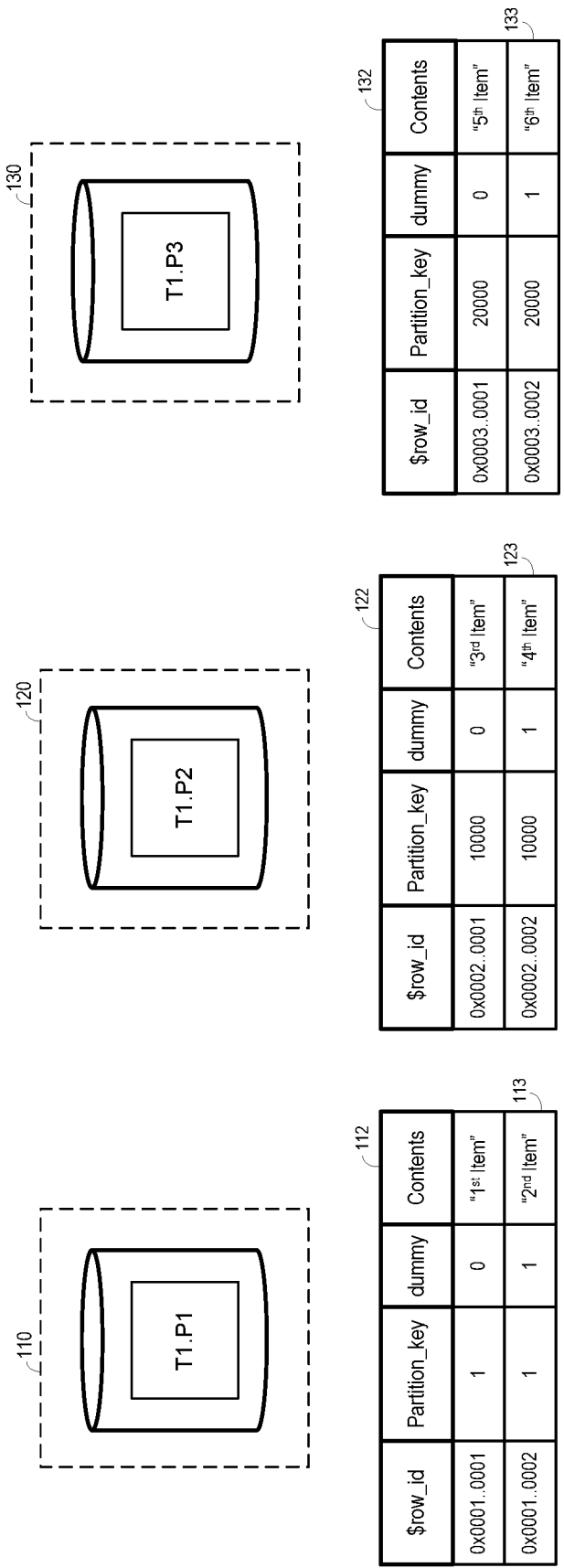
FIG. 2 illustrates rows of a table stored in different partitions on different server nodes according to some embodiments.

FIG. 2 illustrates three partitions 112, 122 and 132 of table T1 stored in nodes 110, 120 and 130 for the purpose of describing operation according to some embodiments. As shown, table T1 includes a partitioning column named Partition_key, as well as columns labeled "dummy" and "Contents. The $row_id column is internally generated by the database management system upon creation of a table row. According to some embodiments, the first four bits of the $row_id column value for a given row indicate the partition to which the row is assigned, and the remaining bits comprise a unique identifier of the row within its partition. Embodiments may implement any other protocol for indicating a partition within a row identifier.

Table T1 is range-partitioned based on the value of the partitioning column, but embodiments are not limited thereto. According to some embodiments, table T1 is created and stored among nodes 110, 120 and 130 in response to the following statement:

```
create column table T (partition_key int, dummy int,
content varchar(200)) partition by range (partition_key)
    (partition 1 <= values < 10000,
    partition 10000 <= values < 20000,
    partition others);
alter table T move partition 1 to 'NODE_1';
alter table T move partition 2 to 'NODE_2';
alter table T move partition 3 to 'NODE_3';
```

It will now be assumed that a query is received by node 100 to update the values of the partitioning column of specified rows of table T1. An example query may read as follows: update T1 set partition_key=30000 WHERE dummy=1. This query requests updating of the Partition_key column value to 30000 for those rows of table T1 which include a value of 1 in their dummy field. With respect to the FIG. 2 example, the rows specified by the received query are identified as rows 113, 123 and 133 of partitions 112, 122 and 132.

Figure 3:
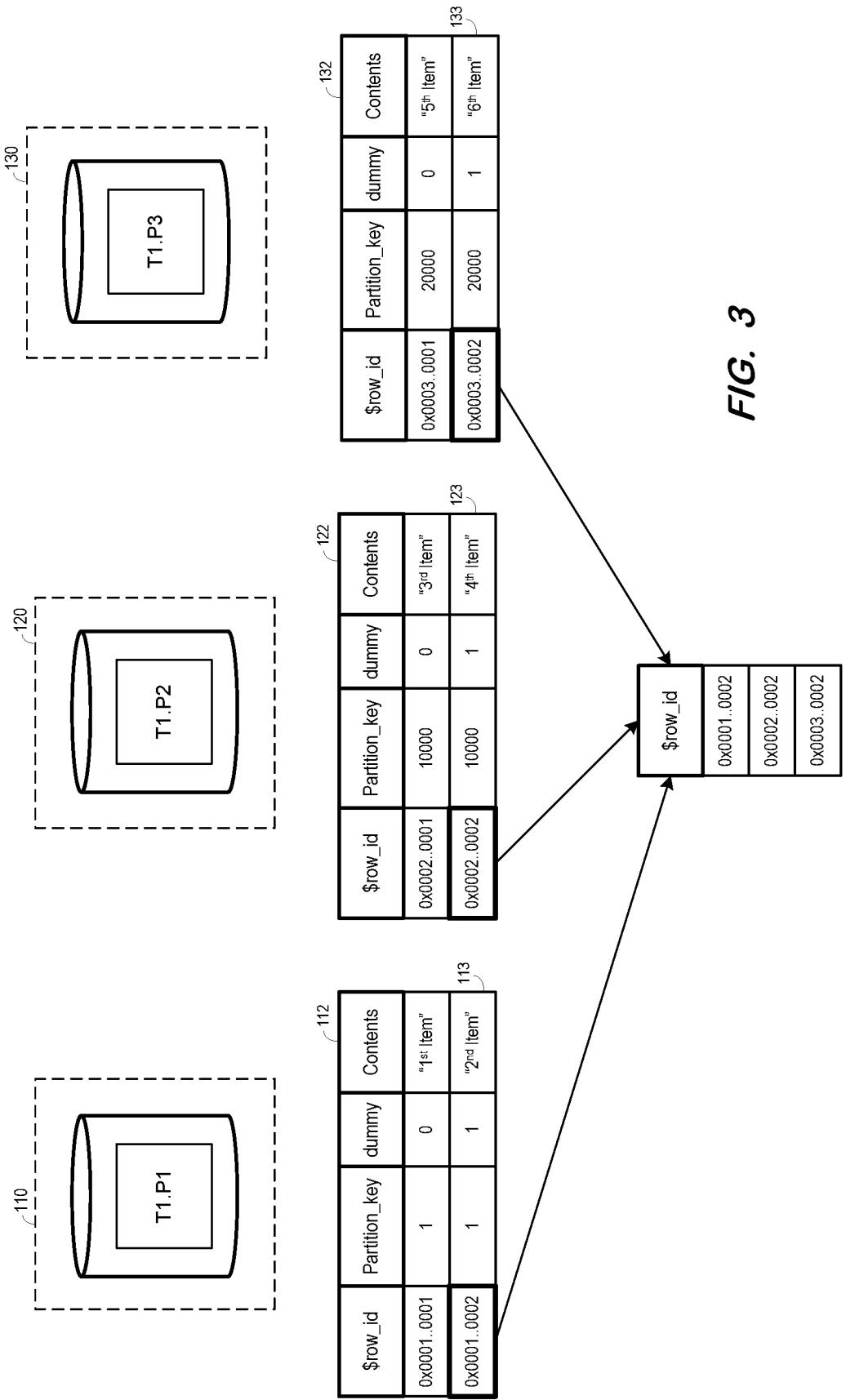
FIG. 3 illustrates fetching of row identifier fields of a specified subset of the rows of the table stored in different partitions on different server nodes according to some embodiments.

Next, node 100 retrieves the $row_id fields of each of the specified rows. FIG. 3 illustrates retrieval of the $row_id fields of each of the specified rows of the present example. Retrieval of the $row_id fields may consume significantly less bandwidth and other resources than retrieval of the entirety of each of rows 113, 123 and 133.

Figure 4:
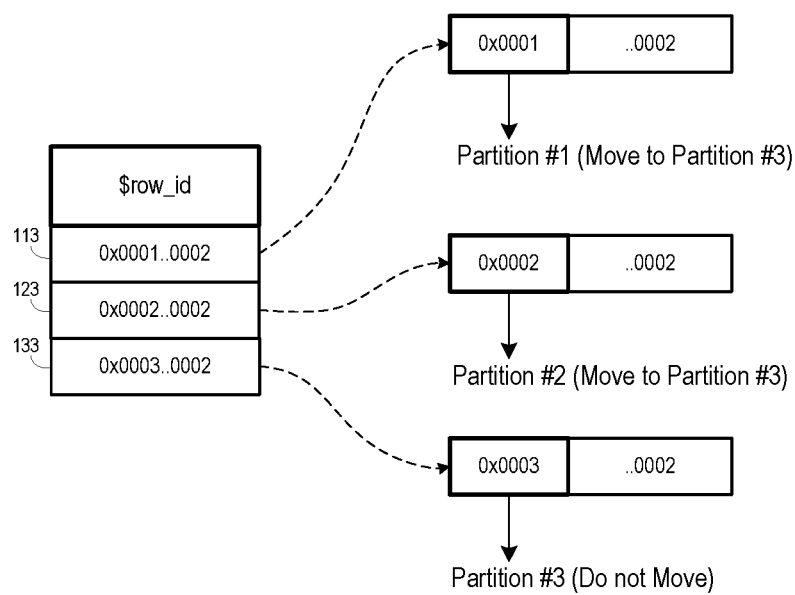
FIG. 4 illustrates determination of rows to be moved to a new partition according to some embodiments.

FIG. 4 illustrates determination of whether each row represented by the fetched row identifiers is to be moved to a new server node based on the updated value. This determination initially requires determination of the partition associated with the updated value of the partitioning key. The value is being updated to 30000, corresponding to partition P3 located on node 130.

The current locations of each row are also determined based on the first four bits of their fetched $row_id values. Rows 113, 123 and 133 are determined to correspond to partitions P1, P2 and P3, respectively, and to therefore be stored in nodes 110, 120 and 130, respectively. Since each row is to be stored in partition P3 as a result of the update statement, FIG. 4 illustrates that rows 113 and 123 are to be moved to partition P3 of server node 130 and that row 133 is to remain at partition P3 of server node 130.

Figure 5:
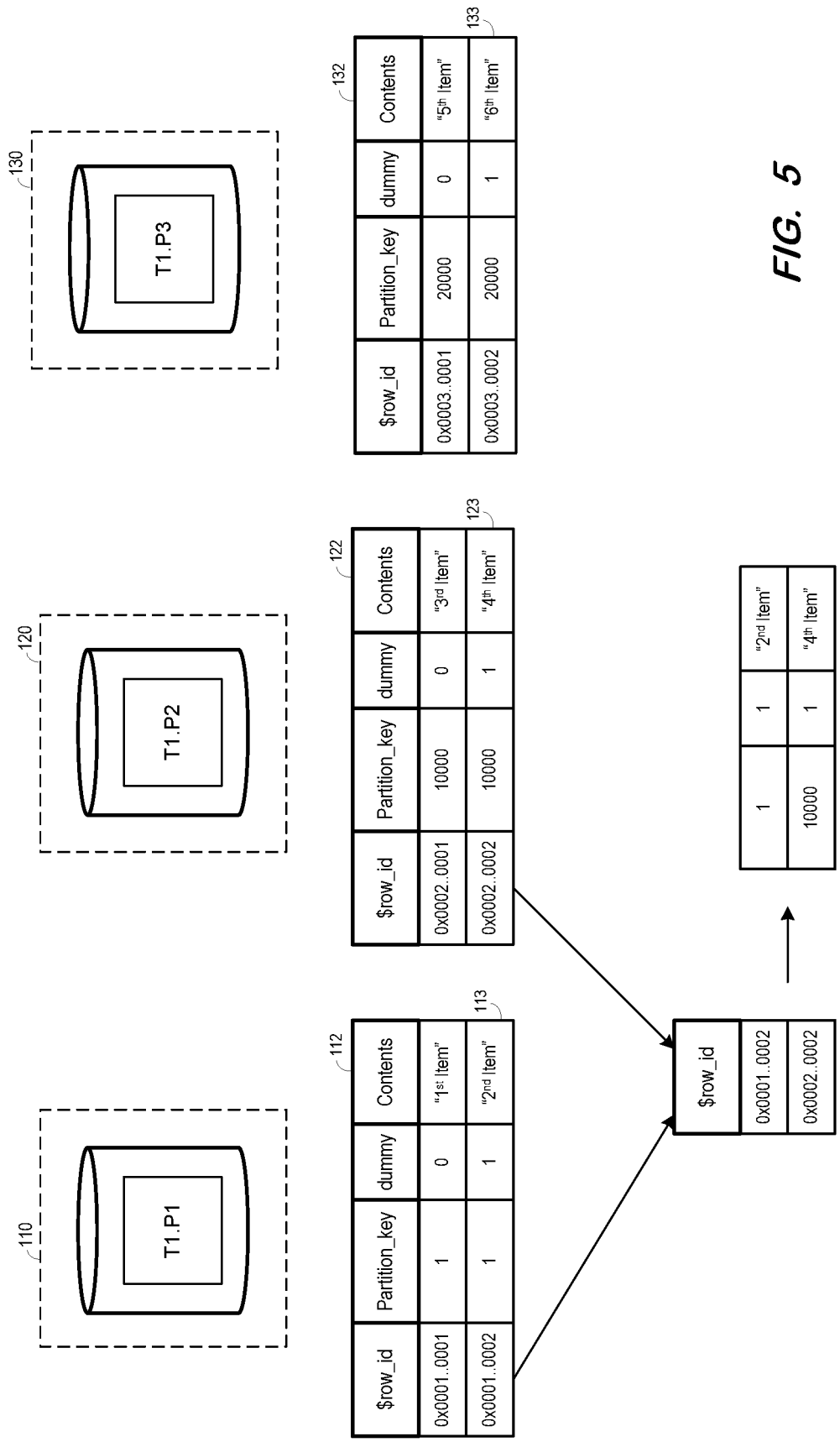
FIG. 5 illustrates fetching of rows to be moved to a new partition according to some embodiments.

The rows to be moved are then fetched from their respective partitions/server nodes. Continuing the present example, FIG. 5 shows the fetching of rows 113 and 123 from server nodes 112 and 122 using their $row_id values. The rows may be fetched by server node 100. Due to the uniqueness of these values, such fetching can be performed more quickly than a general search of field values. Notably, row 133, which was also specified by the received query, is not fetched. As also shown in FIG. 5, all columns other than the non-$row_id column may be fetched.

Figure 6:
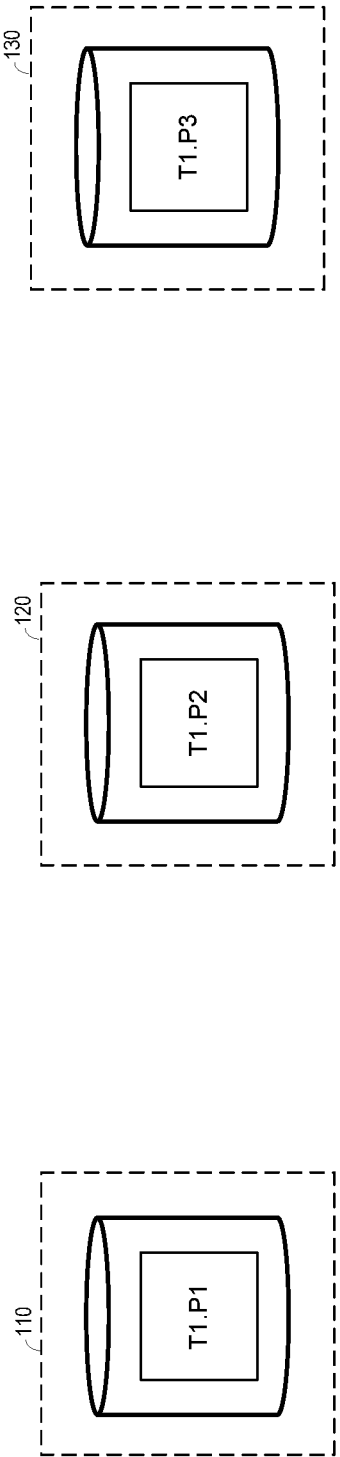
FIG. 6 illustrates updated of fetched rows to be moved to a new partition according to some embodiments.
Figure 7:
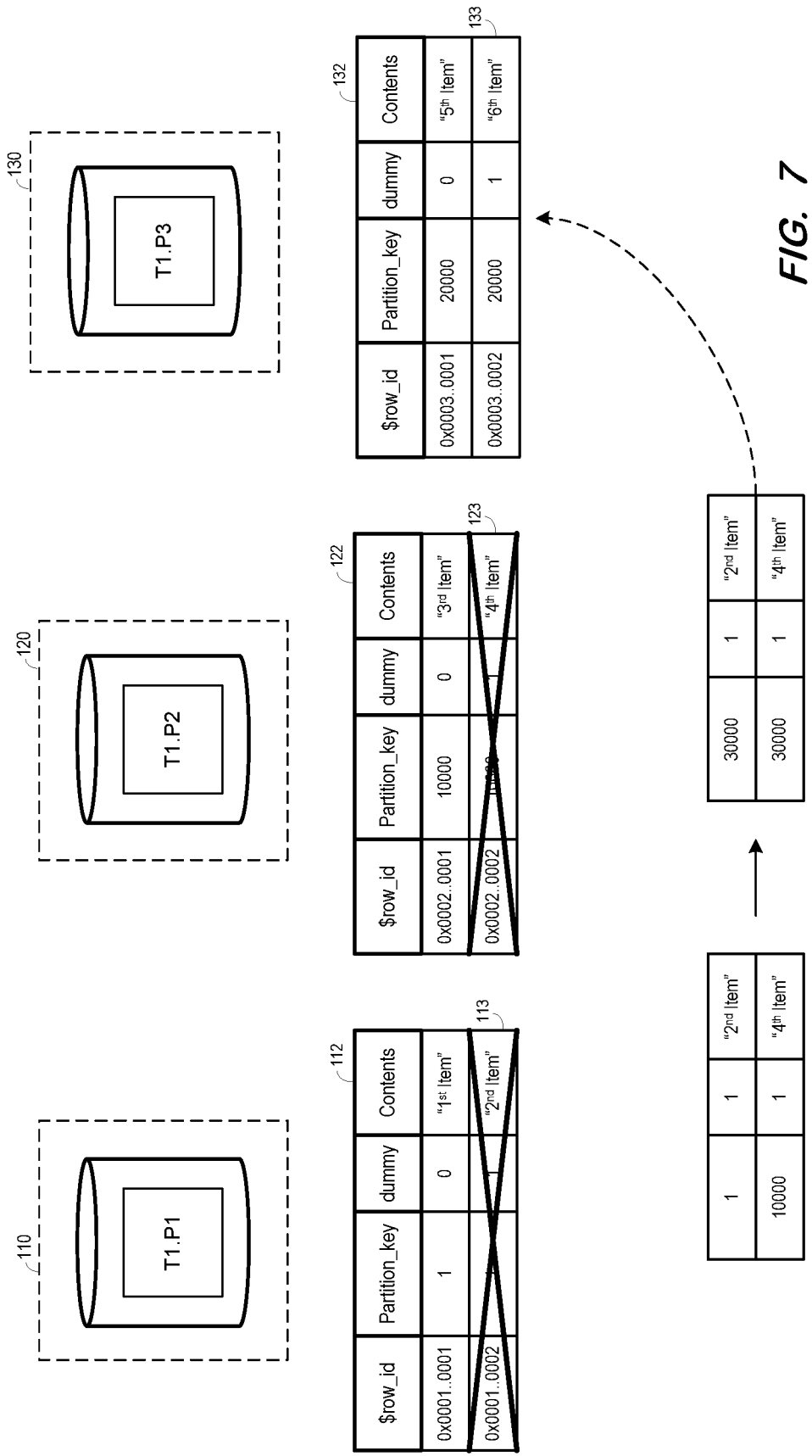
FIG. 7 illustrates deletion and insertion of rows according to some embodiments.

The partitioning key values of the fetched rows are updated as shown in FIG. 6. According to the present example, server node 100 updates the values 1 and 10000 of the two fetched rows to 30000. Server node 100 then instructs nodes 110 and 120 to delete fetched rows as illustrated in FIG. 7. As also illustrated in FIG. 7, the updated rows are inserted into destination partition P3 of node 130.

Figure 8:
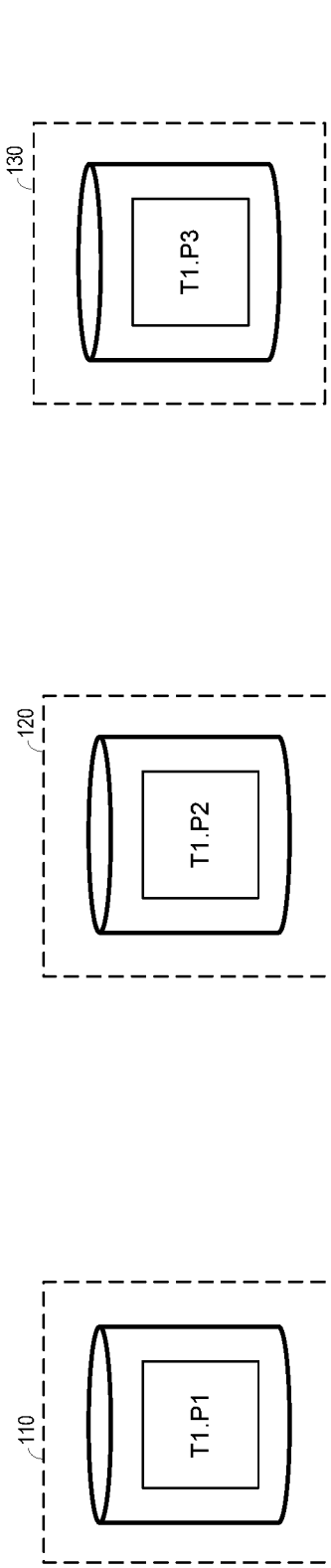
FIG. 8 illustrates a completed move of updated table rows to a new partition according to some embodiments.

FIG. 8 illustrates the completed insertion. As mentioned above, new $row_id values are internally generated for each inserted row during the insertion process. The new $row_id values identify new partition P3 to which the rows belong.

Figure 9:
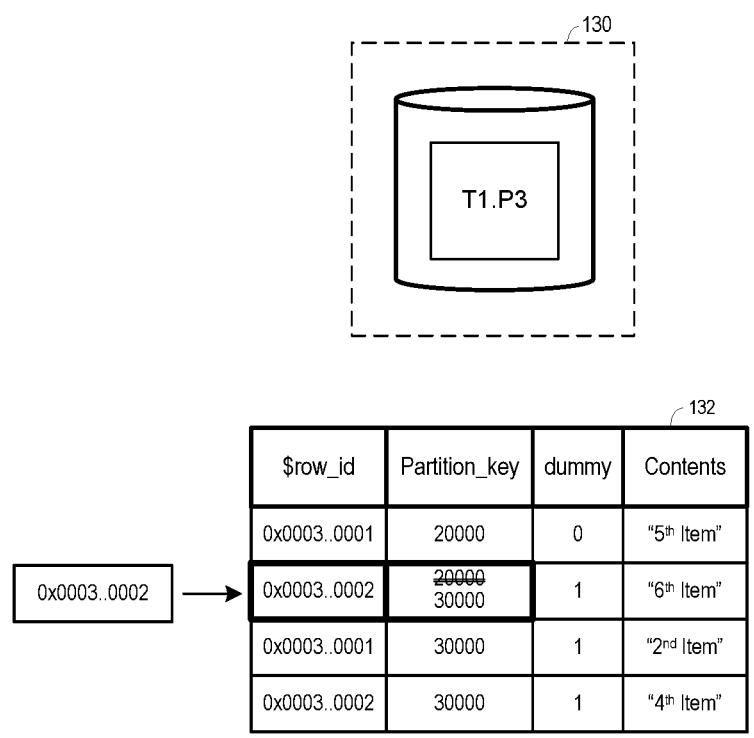
FIG. 9 illustrates update of a table row at a partition according to some embodiments.

FIG. 9 illustrates updating of rows which were specified for updating but which were determined to not require partition movement as illustrated in FIG. 4. With reference to FIG. 4, server node 100 uses the $row_id for the non-moving row to update the partitioning key value of the row as specified by the received update statement. FIG. 9 illustrates the requested update from 20000 to 30000.

Figure 10:
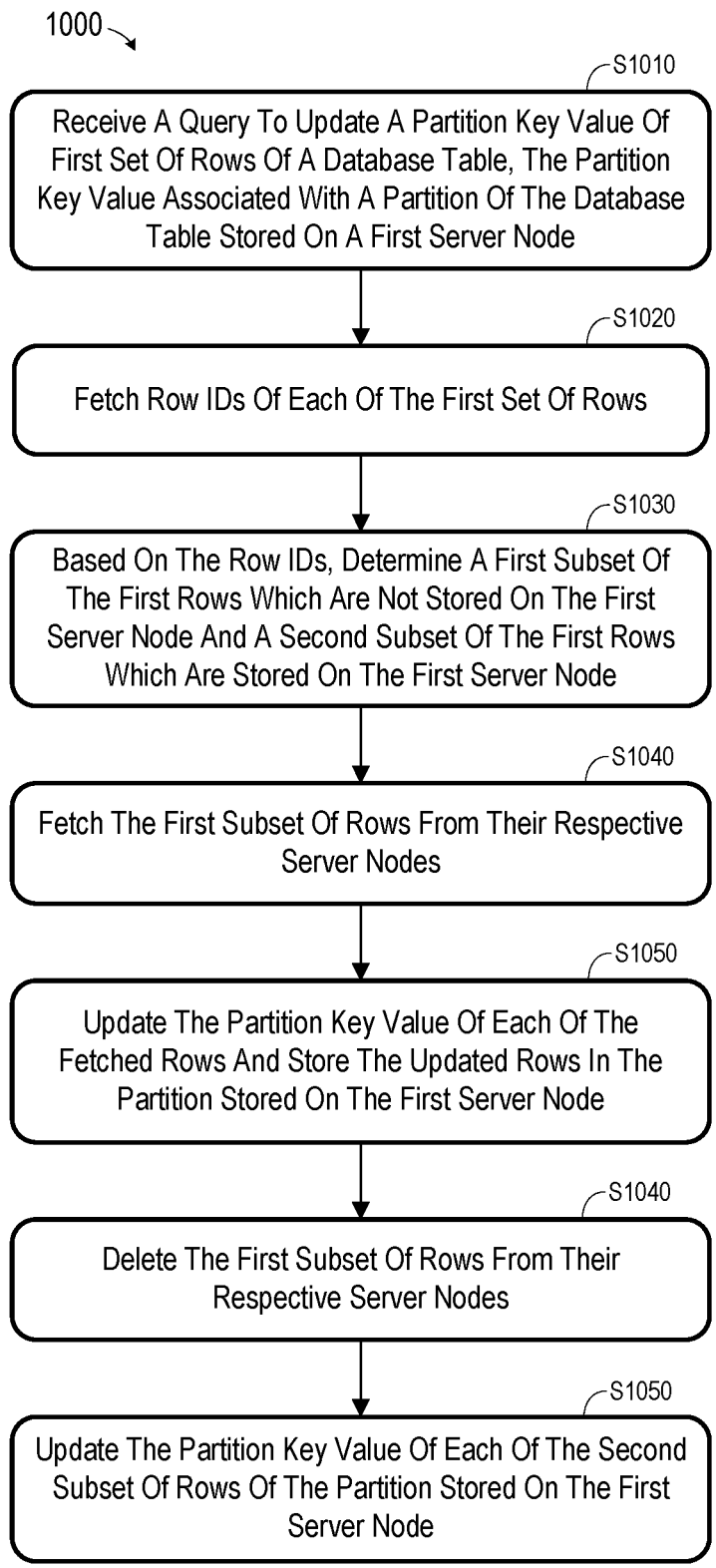
FIG. 10 is a flow diagram to insert rows of a partition of a first table into a partition of a second table according to some embodiments.

FIG. 10 comprises a flow diagram of process 1000 according to some embodiments. In some embodiments, various hardware elements of server node 100 execute program code to perform process 1000. Process 1000 may be executed by the query processor of server node 100.

Process 1000 and all other processes mentioned herein may be embodied in computer-executable program code read from one or more of non-transitory computer-readable media, such as a hard disk drive, a nonvolatile or nonvolatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S1010, a query is received. to update a partition key value of first set of rows of a database table. The partition key value is associated with a partition of the database table which is stored on a first server node. The first set of rows may be identified by a WHERE clause of the query, such as "WHERE dummy=1" of the above example. Next, as described with respect to FIG. 3, row identifiers of each of the first set of rows are fetched at S1020.

At S1030, and based on the fetched row identifiers, a first subset of the first rows which are not stored on the first server node is determined. Also determined at S1030 are a second subset of the first rows which are stored on the first server node. With respect to the above example, FIG. 4 shows determination of a first subset (113, 123) and a second subset (133) of the first set of rows at S1030. The first subset of rows is fetched from their respective server nodes at S1040 as illustrated in FIG. 5.

Next, as shown in FIGS. 6-8, the partition key value of each of the fetched rows is updated and the updated rows are stored in the partition stored on the first server node at S1040. The first subset of rows are deleted from their respective server nodes at S1050. Finally, at S1050 and as shown in FIG. 9, the partition key value of each of the second subset of rows of the partition stored on the first server node is updated.

Figure 11:
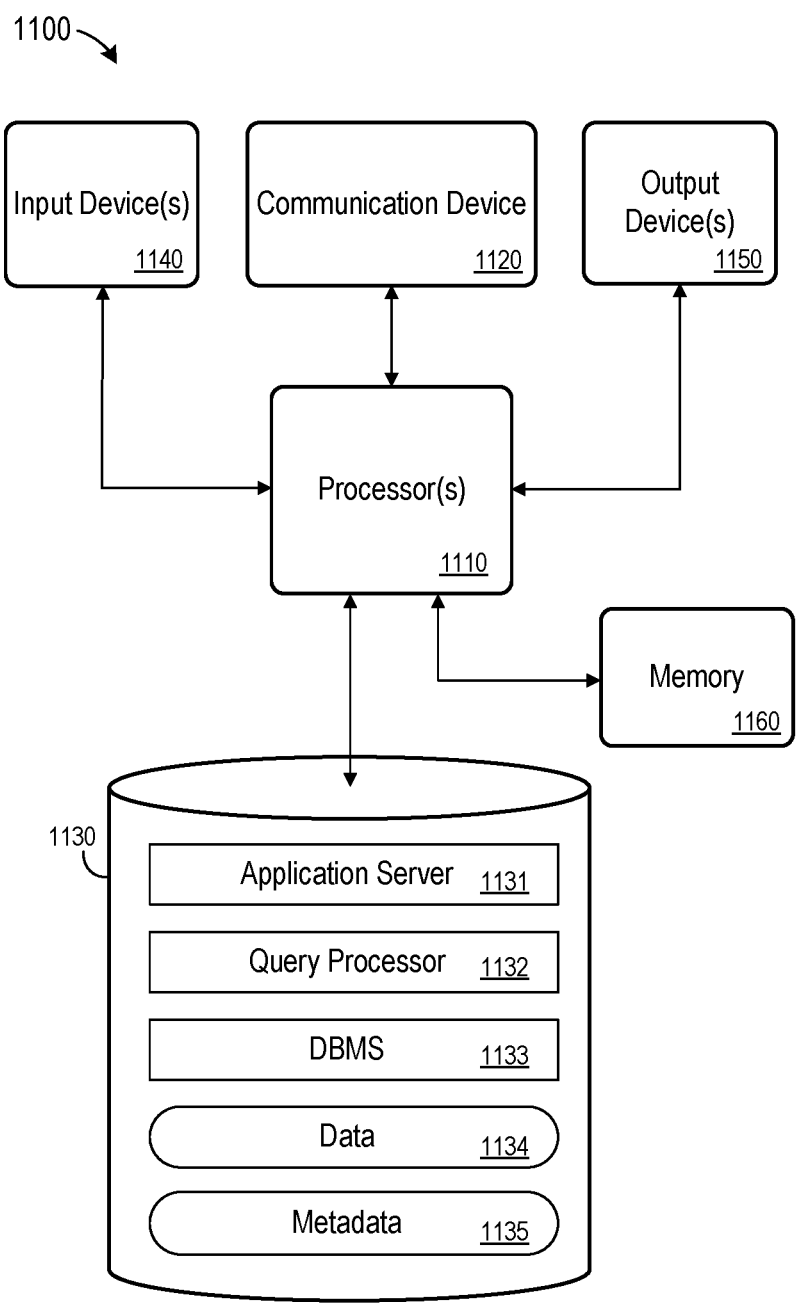
FIG. 11 is a block diagram of a database node according to some embodiments.

FIG. 11 is a block diagram of server node 1100 according to some embodiments. Server node 1100 may comprise a general-purpose computing apparatus and may execute program code to perform any of the functions described herein. Server node 1100 may comprise an implementation of server node 100 in some embodiments.

Server node 1100 may include other unshown elements according to some embodiments. Server node 1100 includes processor(s) 1110 operatively coupled to communication device 1120, data storage device 1130, one or more input devices 1140, one or more output devices 1150 and memory 1160. Communication device 1120 may facilitate communication with external devices, such as a reporting client, or a data storage device. Input device(s) 1140 may comprise, for example, a keyboard, a keypad, a mouse or other pointing device, a microphone, knob or a switch, an infrared (IR) port, a docking station, and/or a touch screen. Input device(s) 1140 may be used, for example, to enter information into apparatus 1100. Output device(s) 1150 may comprise, for example, a display (e.g., a display screen) a speaker, and/or a printer.

Data storage device 1130 may comprise any appropriate persistent storage device, including combinations of magnetic storage devices (e.g., magnetic tape, hard disk drives and flash memory), optical storage devices, Read Only Memory (ROM) devices, etc., while memory 1160 may comprise Random Access Memory (RAM).

Application server 1131 and query processor 1132 may each comprise program code executed by processor(s) 1110 to cause server 1100 to perform any one or more of the processes described herein. Embodiments are not limited to execution of these processes by a single computing device.

Data 1134 may include conventional partitioned database data as described above. As also described above, database data (either cached or a full database) may be stored in volatile memory such as volatile memory 1160. Data storage device 1130 may also store data and other program code for providing additional functionality and/or which are necessary for operation of server 1100, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
a first database server node comprising a processor and memory including instructions which when executed by the processor cause the first database server node to:
receive a query to update a partition key value of a first set of rows of a database table, the updated partition key value associated with a first partition of the database table stored on a second database server node, and the first set of rows comprising rows of two or more partitions of the database table stored in two or more database server nodes;
fetch row identifiers of each of the first set of rows from the database server nodes in which each of the first set of rows is stored, wherein the row identifiers are stored separately from the partition key values;
based on the row identifiers, determine a first subset of the first rows which are not stored on the second database server node and a second subset of the first rows which are stored on the second database server node;
fetch the first subset of rows from the database server nodes in which each of the first set of rows is stored;
update the partition key value of each row of the fetched first subset of rows;
instruct the second database server node to store the updated rows of the fetched first subset in the first partition stored on the second database server node;
instruct the second database server node to update the partition key value of each of the second subset of rows of the partition stored on the second database server node; and
update the row identifier of each of the first set of rows based on the updated partition key value.

2. A system according to claim 1, further comprising:
the second database server node storing the first partition; and a third database server node storing at least one of the first subset of rows, the at least one of the first subset of rows associated with a second partition of the database table.

3. A system according to claim 1, wherein determination of the first subset and the second subset is based on a first four bits of the fetched row identifiers.

4. A system according to claim 1, the first database server node to:
receive a second query to update a partition key value of a second set of rows of the database table, the updated partition key value of the second set of rows associated with a second partition of the database table stored on a third database server node, and the second set of rows comprising rows of two or more partitions of the database table stored in the two or more database server nodes;
fetch second row identifiers of each of the second set of rows from the database server nodes in which each of the second set of rows is stored;
based on the second row identifiers, determine a first subset of the second set of rows which are not stored on the third database server node and a second subset of the second set of rows which are stored on the third database server node;
fetch the first subset of the second set of rows from the database server nodes in which each of the second set of rows is stored;
update the partition key value of each row of the fetched first subset of the second set of rows;
instruct the third database server node to store the updated rows of the fetched first subset of the second set of rows in the second partition stored on the third database server node; and
instruct the third database server node to update the partition key value of each of the second subset of the second set of rows of the second partition stored on the third database server node.

5. A system according to claim 1, the first database server node to:
receive a second query to update a partition key value of a first set of rows of a second database table, the updated partition key value associated with a first partition of the second database table stored on the second database server node, and the first set of rows comprising rows of two or more partitions of the database table stored in two or more database server nodes;
fetch row identifiers of each of the first set of rows of the second database table from the database server nodes in which each of the first set of rows of the second database table is stored;
based on the row identifiers, determine a first subset of the first rows of the second database table which are not stored on the second database server node and a second subset of the first rows of the second database table which are stored on the second database server node;
fetch the first subset of rows of the second database table from the database server nodes in which each of the first set of rows of the second database table is stored;
update the partition key value of each row of the fetched first subset of rows of the second database table;
instruct the second database server node to store the updated rows of the fetched first subset of the second database table in the first partition stored on the second database server node; and instruct the second database server node to update the partition key value of each of the second subset of rows of the second database table of the partition stored on the second database server node.

6. A system according to claim 5, wherein determination of the first subset and the second subset is based on a first four bits of the fetched row identifiers.

7. A computer-implemented method, comprising:
receiving a query to update a partition key value of a first set of rows of a database table;
determining that the updated partition key value is associated with a first partition of the database table stored on a first database server node;
fetching row identifiers of each of the first set of rows from two or more database server nodes in which each of the first set of rows is respectively stored, wherein the row identifiers are stored separately from the partition key values;
based on the row identifiers, determining a first subset of the first rows which are not stored on the first database server node and a second subset of the first rows which are stored on the first database server node;
fetching the first subset of rows from the database server nodes in which each of the first set of rows is respectively stored;
updating the partition key value of each row of the fetched first subset of rows;
instructing the first database server node to store the updated rows of the fetched first subset in the first partition stored on the first database server node;
instructing the first database server node to update the partition key value of each of the second subset of rows of the partition stored on the first database server node; and
updating the row identifier of each of the first set of rows based on the updated partition key values.

8. A method according to claim 7, wherein a second database server node stores at least one of the first subset of rows, the at least one of the first subset of rows associated with a second partition of the database table.

9. A method according to claim 7, wherein determining the first subset and the second subset is based on a first four bits of the fetched row identifiers.

10. A method according to claim 7, further comprising:
receiving a second query to update a partition key value of a second set of rows of the database table;
determining that the updated partition key value of the second set of rows is associated with a second partition of the database table stored on a second database server node;
fetching second row identifiers of each of the second set of rows from the database server nodes in which each of the second set of rows is stored;
based on the second row identifiers, determining a first subset of the second set of rows which are not stored on the second database server node and a second subset of the second set of rows which are stored on the second database server node;
fetching the first subset of the second set of rows from the database server nodes in which each of the second set of rows is stored;
updating the partition key value of each row of the fetched first subset of the second set of rows;
instructing the second database server node to store the updated rows of the fetched first subset of the second set of rows in the second partition stored on the second database server node; and instructing the second database server node to update the partition key value of each of the second subset of the second set of rows of the second partition stored on the second database server node.

11. A method according to claim 7, further comprising:
receiving a second query to update a partition key value of a first set of rows of a second database table;
determining that the updated partition key value of the first set of rows of the second database table is associated with a first partition of the second database table stored on the first database server node, and the first set of rows comprising rows of two or more partitions of the database table;
fetching row identifiers of each of the first set of rows of the second database table from the database server nodes in which each of the first set of rows of the second database table is stored;
based on the row identifiers, determining a first subset of the first rows of the second database table which are not stored on the first database server node and a second subset of the first rows of the second database table which are stored on the first database server node;
fetching the first subset of rows of the second database table from the database server nodes in which each of the first set of rows of the second database table is stored;
updating the partition key value of each row of the fetched first subset of rows of the second database table;
instructing the first database server node to store the updated rows of the fetched first subset of the second database table in the first partition stored on the first database server node; and
instructing the first database server node to update the partition key value of each of the second subset of rows of the second database table of the partition stored on the first database server node.

12. A method according to claim 11, wherein determining the first subset and the second subset is based on a first four bits of the fetched row identifiers.

13. A non-transitory computer-readable medium storing program code executable by a computing system to cause the computing system to:
receive a query to update a partition key value of a first set of rows of a database table;
determine that the updated partition key value is associated with a first partition of the database table stored on a first database server node;
fetch row identifiers of each of the first set of rows from two or more database server nodes in which each of the first set of rows is respectively stored, wherein the row identifiers are stored separately from the partition key values;
based on the row identifiers, determine a first subset of the first rows which are not stored on the first database server node and a second subset of the first rows which are stored on the first database server node;
fetch the first subset of rows from the database server nodes in which each of the first set of rows is respectively stored;
update the partition key value of each row of the fetched first subset of rows;
instruct the first database server node to store the updated rows of the fetched first subset in the first partition stored on the first database server node;

instruct the first database server node to update the partition key value of each of the second subset of rows of the partition stored on the first database server node; and
update the row identifier of each of the first set of rows based on the updated partition key value.

14. A medium according to claim 13, wherein a second database server node stores at least one of the first subset of rows, the at least one of the first subset of rows associated with a second partition of the database table.

15. A medium according to claim 13, wherein determination of the first subset and the second subset is based on a first four bits of the fetched row identifiers.

16. A medium according to claim 13, the program code executable by a computing system to cause the computing system to:
receive a second query to update a partition key value of a second set of rows of the database table;
determine that the updated partition key value of the second set of rows is associated with a second partition of the database table stored on a second database server node;
fetch second row identifiers of each of the second set of rows from the database server nodes in which each of the second set of rows is stored;
based on the second row identifiers, determine a first subset of the second set of rows which are not stored on the second database server node and a second subset of the second set of rows which are stored on the second database server node;
fetch the first subset of the second set of rows from the database server nodes in which each of the second set of rows is stored;
update the partition key value of each row of the fetched first subset of the second set of rows;
instruct the second database server node to store the updated rows of the fetched first subset of the second set of rows in the second partition stored on the second database server node; and
instruct the second database server node to update the partition key value of each of the second subset of the second set of rows of the second partition stored on the second database server node.

17. A medium according to claim 13, the program code executable by a computing system to cause the computing system to:
receive a second query to update a partition key value of a first set of rows of a second database table;
determine that the updated partition key value of the first set of rows of the second database table is associated with a first partition of the second database table stored on the first database server node, and the first set of rows comprising rows of two or more partitions of the database table;
fetch row identifiers of each of the first set of rows of the second database table from the database server nodes in which each of the first set of rows of the second database table is stored;
based on the row identifiers, determine a first subset of the first rows of the second database table which are not stored on the first database server node and a second subset of the first rows of the second database table which are stored on the first database server node;
fetch the first subset of rows of the second database table from the database server nodes in which each of the first set of rows of the second database table is stored;

update the partition key value of each row of the fetched first subset of rows of the second database table;

instruct the first database server node to store the updated rows of the fetched first subset of the second database table in the first partition stored on the first database server node; and instruct the first database server node to update the partition key value of each of the second subset of rows of the second database table of the partition stored on the first database server node.

18. A medium according to claim 17, wherein determination of the first subset and the second subset is based on a first four bits of the fetched row identifiers.

* * * * *